Reissued Apr. 24, 1928. Re. 16,939

UNITED STATES PATENT OFFICE.

JOSEPH G. DINWIDDIE, OF PENNS GROVE, NEW JERSEY, ASSIGNOR TO E. I. DU PONT DE NEMOURS & COMPANY, OF WILMINGTON, DELAWARE, A CORPORATION OF DELAWARE.

VAT DYESTUFF AND PROCESS OF MAKING SAME.

No Drawing. Original No. 1,558,252, dated October 20, 1925, Serial No. 1,153, filed January 8, 1925. Application for reissue filed December 2, 1926. Serial No. 152,241.

This invention relates to violet vat dyestuffs resulting from the condensation of a halo-isatin-chloride with an hydroxy-methyl-halo-thionaphthene, and to the process of their production. Particularly it relates to the condensation of dibromisatin-chloride with 2-hydroxy-3-methyl-5-chloro-thionaphthene, having the formula:

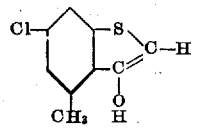

German Patent No. 193,150 describes a violet dyestuff produced by condensing isatin chloride with 2-hydroxy-thionaphthene and subsequently brominating this condensation product in nitro-benzene, sulfuric acid or other inert solvent.

By the process described below a new dye is obtained, which has properties superior to that described in German Patent No. 193,150 in regard to brightness, shade and tinctorial value.

My invention may be illustrated by the following specific example:

Heat under reflux with mono-chlorobenzene or another suitable inert solvent 10.35 parts of dibromisatin together with a slight excess of phosphorus pentachloride (for example, with 8.52 parts of the commercial product) until a clear red brown solution is obtained. This solution is mixed with good stirring for at least five minutes with a solution, in an inert solvent such as benzene, of the molecularly equivalent amount of 2-hydroxy-3-methyl-5-chloro-thionaphthene. When sufficient time, say half an hour, has elapsed to insure that the reaction is completed, the dyestuff is filtered off, washed with a solvent such as benzene, then with alcohol and finally dried in an oven at 50–60° C. The dyestuff in powder form has a brilliant red-blue shade; it may be used in the form of powder or may be made into a paste for greater ease in dissolving. Said dyestuff dyes cotton from a yellow orange hydrosulfite vat a bright full shade of violet of very good fastness to light, washing, chlorine, etc.

The temperature at which the reaction between the dibromisatin and the thionaphthene derivative is carried on is, within wide limits, immaterial. The dyestuff has been made with the benzene solution of 2-hydroxy-3-methyl-5-chloro-thionaphthene at room temperature, 20° C., and the dibromisatin chloride solution in chlor-benzene varying from room temperature to the boiling point of mono-chlor-benzene, which is 132° C.

In the condensation of dibromisatin with phosphorus pentachloride, hydrochloric acid is split off as is also the case during the condensation of the dibromisatin-chloride with 2-hydroxy-3-methyl-5-chloro-thionaphthene.

The reactions which occur are probably as follows:

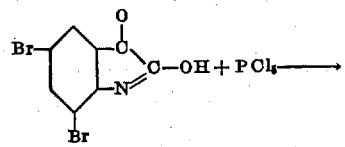

Dibromisatin + Phosphorus Pentachloride

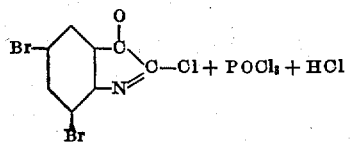

Dibromisatin chloride + $POCl_3$ + HCl

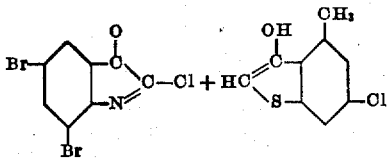

Dibromisatin chloride + 2-hydroxy-3-methyl-5-chloro-thionaphthene,

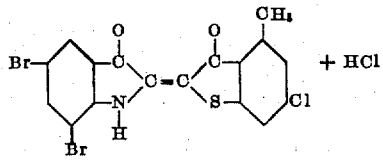

Violet dyestuff.

Although in the above example certain specific conditions of operation have been mentioned, it will be understood that my invention is not limited thereto, but that the procedure may be modified in various ways without departing from the spirit or scope of my invention.

Also, it will be understood that, although certain specific compounds are mentioned in the above example, the invention is not limited thereto but that obviously any halogenated isatin-chloride having the general formula:

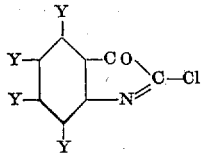

in which one or more of the positions "Y" are occupied by halogen may be employed for coupling with any hydroxy-methyl-halo-thionaphthene of the general formula:

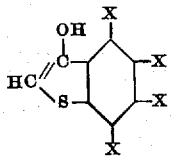

wherein one or more of the positions "X" are occupied by the methyl group and one or more are occupied by halogen.

The new dyestuffs above described are chiefly useful in the dyeing of cotton, but they may also be used to advantage in the dyeing of wool and silk.

I claim:

1. The process of producing a vat dyestuff which comprises condensing a halogenated isatin-chloride with one molecularly-equivalent amount of an hydroxy-methyl-halo-thionaphthene.

2. The process of producing a vat dyestuff which comprises condensing a halogenated isatin-chloride with one molecularly-equivalent amount of 2-hydroxy-3-methyl-5-chloro-thionaphthene.

3. The process of producing a vat dyestuff which comprises mixing a solution of dibromisatin-chloride in an inert solvent, while stirring, with a solution in an inert solvent of 2-hydroxy-3-methyl-5-chloro-thionaphthene, and filtering and drying the precipitate formed.

4. The process which comprises heating 10.35 parts of dibromisatin dissolved in an inert solvent under a reflux condenser with about eight parts of phosphorus pentachloride until a clear red-brown solution is obtained, mixing this solution, while stirring, with a solution of 2-hydroxy-3-methyl-5-chloro-thionaphthene, and recovering the precipitate.

5. As a new compound a vat dyestuff having the general formula:

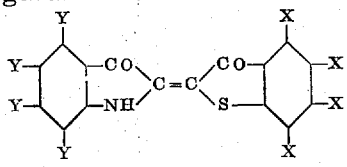

wherein one or more of the positions "Y" are occupied by a halogen and one or more of the positions "X" are occupied by a methyl group and one or more of the positions "X" by a halogen which compound, when dried, is a violet powder dyeing cotton from a hydrosulfite vat to a violet color.

6. As a new compound a vat dyestuff having the general formula:

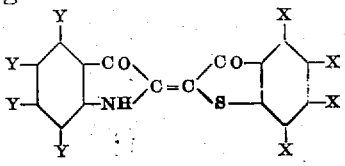

wherein one or more of the positions "Y" are occupied by a halogen, the others being occupied by hydrogen, and one or more positions "X" are occupied by the methyl group and one or more by a halogen, the others being occupied by hydrogen.

7. As a new composition of matter, a product obtainable by condensing a dibromisatin-chloride with 2-hydroxy-3-methyl-5-chloro-thionaphthene, and having most probably the following graphical formula:

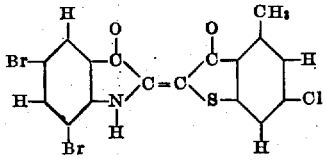

8. A dyestuff obtainable by condensing a halo-isatin-chloride with a molecularly-equivalent amount of an hydroxy-methyl-halo-thionaphthene.

9. A dyestuff obtainable by condensing a di-halo-isatin-chloride with an hydroxy-methyl-halo-thionaphthene, and purifying the resulting condensation product, said dyestuff dyeing cotton from a hydrosulfite vat a violet color of excellent fastness to light, washing, and chlorine.

10. As a new composition of matter, a product obtainable by condensing a dibromisatin-chloride with 2-hydroxy-3-methyl-5-chloro-thionaphthene, said product having, in powder form, a brilliant red-blue shade, and dyeing cotton fiber from a yellow orange hydrosulfite vat a bright full shade of violet of excellent fastness to light, washing, and chlorine.

In testimony whereof I affix my signature.

JOSEPH G. DINWIDDIE.